(12) United States Patent
Kumkar et al.

(10) Patent No.: US 12,233,475 B2
(45) Date of Patent: Feb. 25, 2025

(54) PROCESSING OPTICAL UNIT, LASER PROCESSING APPARATUS AND METHOD FOR LASER PROCESSING

(71) Applicant: TRUMPF Laser- und Systemtechnik GmbH, Ditzingen (DE)

(72) Inventors: Malte Kumkar, Weimar (DE); Jonas Kleiner, Leonberg (DE); Daniel Grossmann, Schramberg (DE); Daniel Flamm, Ludwigsburg (DE)

(73) Assignee: TRUMPF LASER- UND SYSTEMTECHNIK GMBH, Ditzingen (DE)

( * ) Notice: Subject to any disclaimer, the term of this patent is extended or adjusted under 35 U.S.C. 154(b) by 765 days.

(21) Appl. No.: 17/500,956

(22) Filed: Oct. 14, 2021

(65) Prior Publication Data

US 2022/0032398 A1 Feb. 3, 2022

Related U.S. Application Data

(63) Continuation of application No. PCT/EP2020/059716, filed on Apr. 6, 2020.

(30) Foreign Application Priority Data

Apr. 15, 2019 (DE) ..................... 10 2019 205 394.7

(51) Int. Cl.
*B23K 26/067* (2006.01)
*B23K 26/06* (2014.01)
(Continued)

(52) U.S. Cl.
CPC ...... *B23K 26/0676* (2013.01); *B23K 26/0624* (2015.10); *B23K 26/0648* (2013.01);
(Continued)

(58) Field of Classification Search
CPC ........... B23K 26/0676; B23K 26/0624; B23K 26/0648; B23K 26/0652; G02B 27/0905;
(Continued)

(56) References Cited

U.S. PATENT DOCUMENTS

2004/0196453 A1* 10/2004 Some ..................... G01N 25/72
356/237.1
2011/0256736 A1 10/2011 Cho et al.
(Continued)

FOREIGN PATENT DOCUMENTS

DE 102011116833 A1 6/2012
DE 102015214960 A1 2/2017
(Continued)

OTHER PUBLICATIONS

Meyer, et al., "Submicron-Quality Cleaving of Glass with Elliptical Ultrafast Bessel Beams," *Applied Physics Letter* 111, 2017, American Institute of Physics, College Park, MD, USA.
(Continued)

*Primary Examiner* — Robert G Bachner
(74) *Attorney, Agent, or Firm* — LEYDIG VOIT & MAYER LTD.

(57) ABSTRACT

A processing optical unit for workpiece processing includes a birefringent polarizer configured to split at least one input laser beam into a pair of partial beams polarized perpendicularly to one another. The processing optical unit further includes a focusing optical unit arranged downstream of the birefringent polarizer in the beam path and configured to focus the pair of partial beams onto focus zones in a focal plane. The processing optical unit is configured to produce at least partly overlapping focus zones of the pair of partial beams.

16 Claims, 5 Drawing Sheets

(51) Int. Cl.
*B23K 26/0622* (2014.01)
*G02B 27/09* (2006.01)
*G02B 27/28* (2006.01)

(52) U.S. Cl.
CPC ...... *B23K 26/0652* (2013.01); *G02B 27/0905* (2013.01); *G02B 27/0927* (2013.01); *G02B 27/0944* (2013.01); *G02B 27/283* (2013.01)

(58) Field of Classification Search
CPC ............ G02B 27/0927; G02B 27/0944; G02B 27/283
See application file for complete search history.

(56) References Cited

U.S. PATENT DOCUMENTS

| | | | |
|---|---|---|---|
| 2011/0292157 A1* | 12/2011 | Ghauri | B41J 2/442 347/255 |
| 2019/0283178 A1 | 9/2019 | Mishchik et al. | |
| 2020/0070280 A1 | 3/2020 | Gauch et al. | |

FOREIGN PATENT DOCUMENTS

| | | | |
|---|---|---|---|
| EP | 1721695 | A1 | 11/2006 |
| JP | 3216987 | B2 | 10/2001 |
| KR | 100746209 | B1 | 8/2007 |
| KR | 20110114972 | A | 10/2011 |
| WO | WO 2006124396 | A2 | 11/2006 |
| WO | WO 2015114032 | A1 | 8/2015 |
| WO | WO 2015128833 | A1 | 9/2015 |
| WO | WO 2016089799 | A1 | 6/2016 |
| WO | WO 2018020145 | A1 | 2/2018 |
| WO | WO 2018162356 | A1 | 9/2018 |

OTHER PUBLICATIONS

Meyer, et al., "Single Shot Ultrafast Laser Processing of High-Aspect Ratio Nanochannels Using Elliptical Bessel Beams," *Optics Letters* 42, 21, Sep. 2017, Optica, Washington D.C., USA.

* cited by examiner

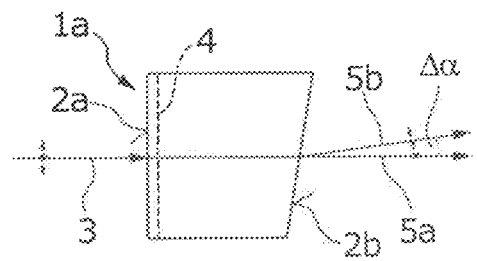
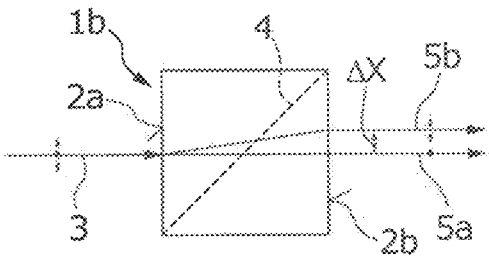
Fig. 1a    Fig. 1b
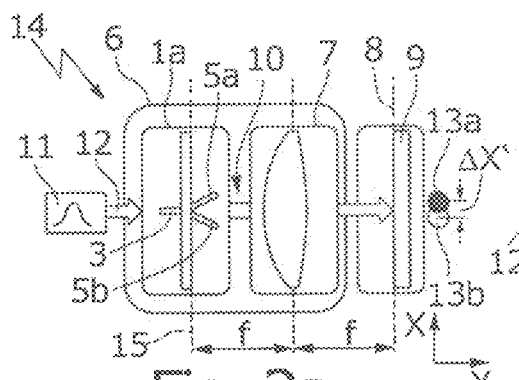
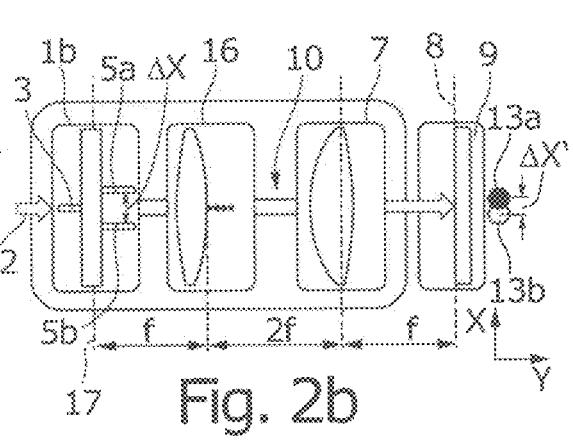
Fig. 2a    Fig. 2b
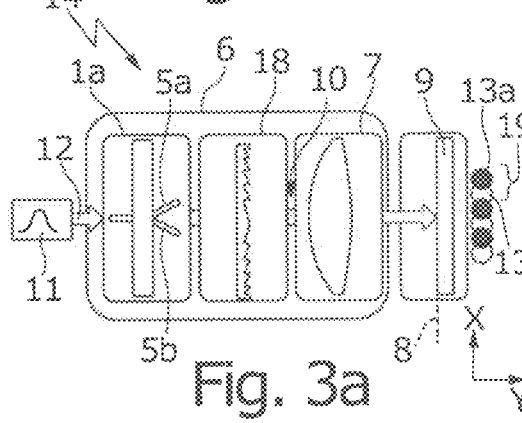
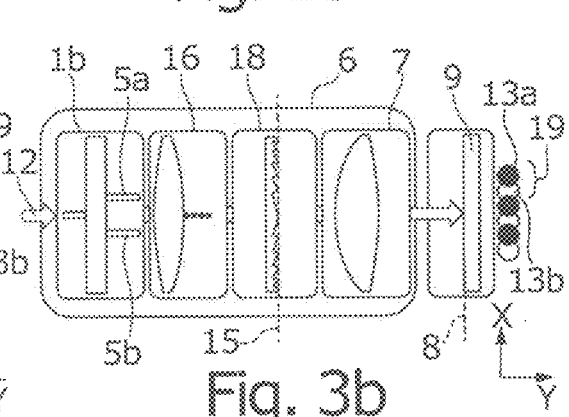
Fig. 3a    Fig. 3b
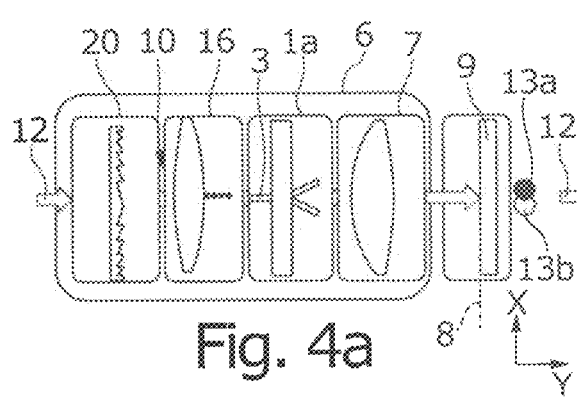
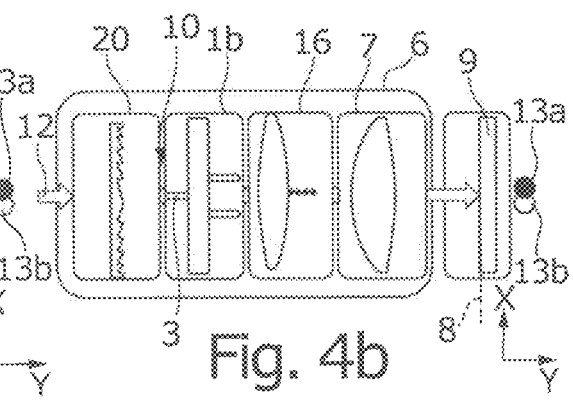
Fig. 4a    Fig. 4b

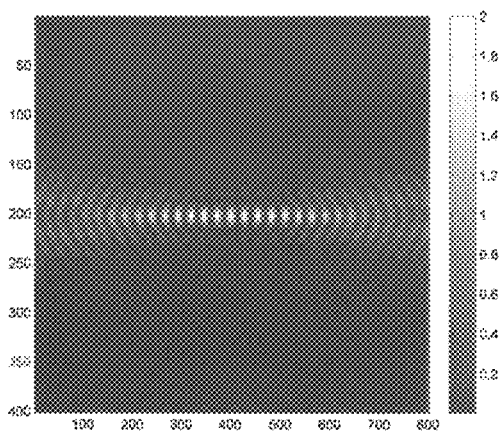
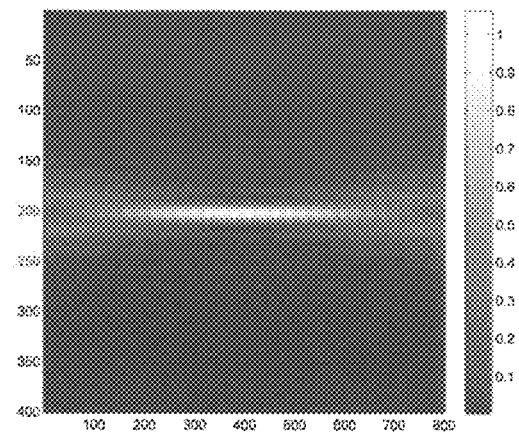
Fig. 7a   Fig. 7b
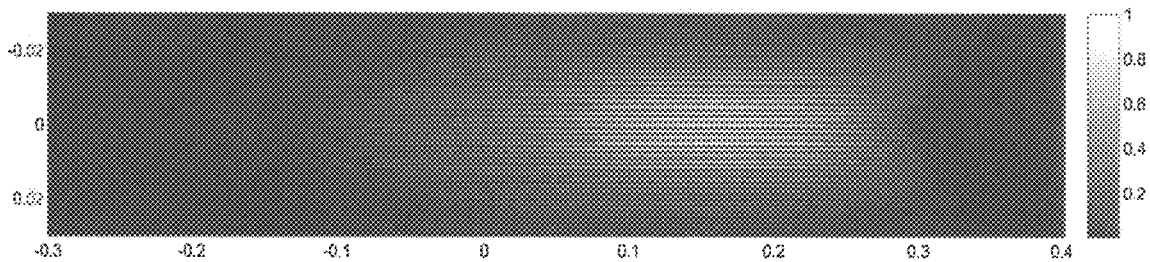
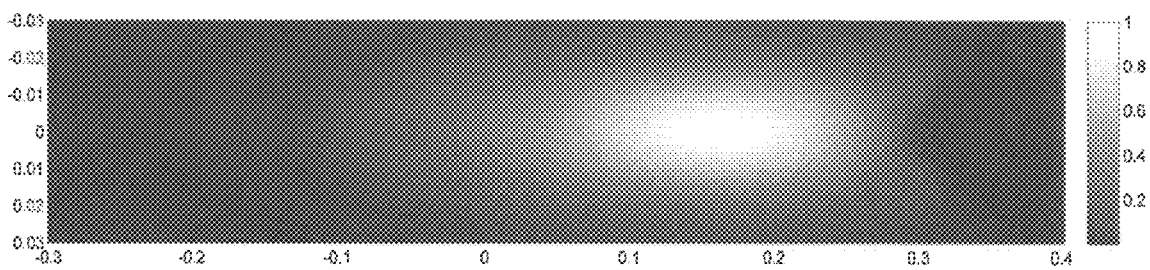
Fig. 8
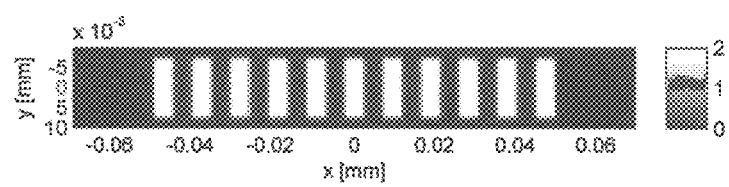
Fig. 9a
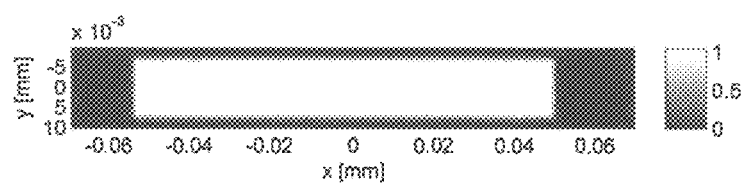
Fig. 9b

PROCESSING OPTICAL UNIT, LASER PROCESSING APPARATUS AND METHOD FOR LASER PROCESSING

CROSS REFERENCE TO RELATED APPLICATIONS

This application is a continuation of International Application No. PCT/EP2020/059716 (WO 2020/212175 A1), filed on Apr. 6, 2020, and claims benefit to German Patent Application No. DE 10 2019 205 394.7, filed on Apr. 15, 2019. The aforementioned applications are hereby incorporated by reference herein.

FIELD

The present disclosure relates to a processing optical unit for workpiece processing, in particular via an ultrashort pulse laser source. The disclosure also relates to a laser processing apparatus comprising such a processing optical unit and to a method for the laser processing of a workpiece via such a processing optical unit.

BACKGROUND

During the laser processing of a workpiece, in particular during laser erosion, laser cutting, surface structuring, laser welding, laser drilling, etc., it is expedient to split an input laser beam into a plurality of partial beams which impinge or are focused on the workpiece at different positions. The splitting can be effected at a polarizer element, wherein two partial beams polarized perpendicularly to one another are formed as output laser beams from one input laser beam. It is possible for a plurality of input laser beams that are spatially offset to impinge on the polarizer element. In this case, each of the input laser beams is split into a pair of partial beams polarized perpendicularly to one another.

WO2015/128833A1 describes a laser cutting head having a polarizing beam offset element for producing two linearly polarized partial beams, said beam offset element being arranged in the beam path of a laser beam. The polarizing beam offset element is arranged in a divergent or in a convergent beam path section of the laser beam. The beam offset element can be formed from a birefringent material. With the use of a focusing, magnifying optical unit and a beam offset element arranged downstream of the focusing optical unit in the beam path, the two partial beams can be partly superimposed in the focal plane.

WO2015/5114032 A1 has disclosed a laser processing apparatus for workpiece processing comprising a processing optical unit, wherein an input laser beam is split into two perpendicularly polarized partial beams at a polarizer. The processing optical unit has a longer path length for the second partial beam than for the first partial beam, as a result of which the second partial beam has a longer propagation time than the first partial beam. The second partial beam is altered in at least one geometric beam property vis a vis the first partial beam. The altered second partial beam is superimposed on the first partial beam in such a way that both partial beams form a common output laser beam.

WO2018/020145A1 describes a method for cutting dielectric or semiconductor material by means of a pulsed laser, wherein a laser beam is split into two partial beams, which impinge on the material in two spatially separated zones offset by a distance with respect to one another. The distance is set to a value below a threshold value in order to produce in the material a rectilinear micro-fracture running in a predefined direction between the two mutually offset zones. Beam shaping can be carried out on the two partial beams in order to produce a spatial distribution on the material in the form of a Bessel beam.

WO2016/089799A1 describes a system for the laser cutting of at least one glass article by means of a pulsed laser assembly comprising a beam shaping optical element for converting an input beam to a quasi-nondiffractive beam, for example a Bessel beam. The laser assembly also comprises a beam transformation element for converting the quasi-nondiffractive beam into a plurality of partial beams spaced apart from one another by between 1 µm and 500 µm.

SUMMARY

In an embodiment, the present disclosure provides a processing optical unit for workpiece processing. The processing optical unit includes a birefringent polarizer configured to split at least one input laser beam into a pair of partial beams polarized perpendicularly to one another, and a focusing optical unit arranged downstream of the birefringent polarizer in the beam path and configured to focus the pair of partial beams onto focus zones in a focal plane. The processing optical unit is configured to produce at least partly overlapping focus zones of the pair of partial beams.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIGS. 1a, 1b show schematic illustrations of two birefringent polarizer elements for producing an angle offset and respectively a position offset between two partial beams polarized perpendicularly to one another, FIGS. 2a,2b show schematic illustrations of a processing optical unit comprising the polarizer element from FIG. 1a and respectively from FIG. 1b for producing two partly overlapping focus zones of the two partial beams in a focal plane, FIGS. 3a,3b show schematic illustrations analogous to FIGS. 2a,b with a diffractive beam splitter optical unit for producing a plurality of pairs of partial beams, the focus zones of which partly overlap one another, FIGS. 4a,4b show schematic illustrations of a processing optical unit analogous to FIGS. 2a,b with a beam shaping optical unit for producing two partly overlapping partial beams having a Bessel-shaped beam profile.

FIGS. 7a,7b show schematic illustrations of a transverse Bessel beam profile produced by means of the processing optical unit from FIGS. 4a,b, FIG. 8 shows schematic illustrations of a longitudinal Bessel beam profile produced by means of the processing optical unit from FIGS. 5a,b, FIGS. 9a,9b show schematic illustrations of a flat-top beam profile produced by means of the processing optical unit from FIGS. 6a,b.

DETAILED DESCRIPTION

Figures 5A, 5B:
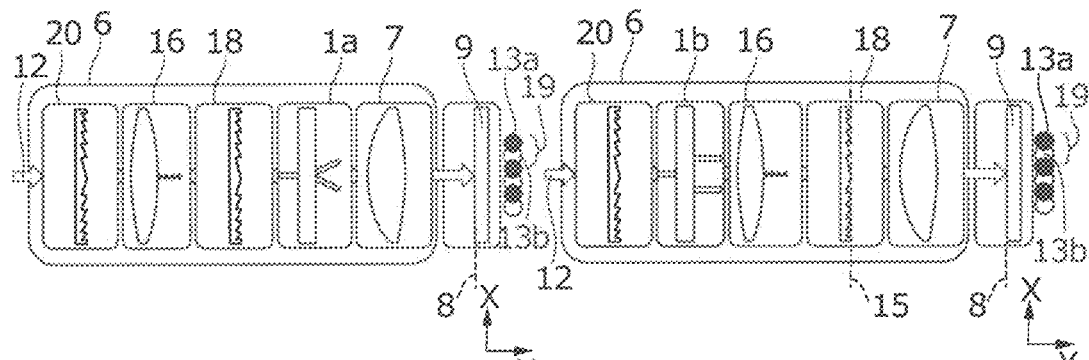
FIGS. 5a,5b show schematic illustrations of a processing optical unit analogous to FIGS. 4a,b with an additional beam splitter optical unit for producing a plurality of pairs of partly overlapping partial beams having a Bessel-shaped beam profile.

The present disclosure provides a processing optical unit, a laser processing apparatus with such a processing optical unit, and a method for laser processing in which undesired interference effects during workpiece processing can be avoided.

According to the disclosure, a processing optical unit is provided in which the processing optical unit is configured for producing at least partly overlapping focus zones of the partial beams polarized perpendicularly to one another, preferably in the focal plane.

The present disclosure provides a processing optical unit for workpiece processing, in particular via an ultrashort pulse laser source, comprising: a birefringent polarizer element for splitting at least one input laser beam into a pair of partial beams polarized perpendicularly to one another, and a focusing optical unit arranged downstream of the polarizer element in the beam path and serving for focusing the partial beams onto focus zones, preferably in a focal plane. The present disclosure further provides a laser processing apparatus comprising such a processing optical unit, and a method for the laser processing of a workpiece via such a processing optical unit. The method includes splitting at least one input laser beam into a pair of partial beams polarized perpendicularly to one another at a birefringent polarizer element of the processing optical unit, and focusing the partial beams onto focus zones in a focal plane in the region of the workpiece by means of a focusing optical unit of the processing optical unit.

Within the meaning of this application, partial beams polarized perpendicularly to one another are understood to mean linearly polarized partial beams whose polarization directions are oriented at an angle of 90° to one another. However, partial beams polarized perpendicularly to one another are also understood to mean circularly polarized partial beams having an opposite rotation sense, i.e. two left and respectively right circularly polarized partial beams. The conversion of linearly polarized partial beams having polarization directions oriented perpendicularly to one another into circularly polarized partial beams having an opposite rotation sense can be effected e.g. with the aid of a suitably oriented retardation plate (λ/4 plate).

If a laser beam which e.g. is generated by a single-mode laser and has a Gaussian beam profile is split into two or more partial beams and the partial beams are at least partially superimposed, this can result in undesired interference effects if the partial beams have the same or a similar polarization. Therefore, during the focusing of the partial beams, the focus zones or the focus cross-sections cannot be arbitrarily close together, and so the partial beams are generally focused at focus zones spaced apart from one another on the workpiece.

With the use of partial beams having mutually perpendicular polarization states, the (partial) superimposition does not give rise to interference effects of the laser radiation from different position or angle ranges, provided that the polarization state of the respective partial beams is uniform over the entire relevant beam cross-section or the respective focus zone. The polarization of a respective partial beam should therefore vary as little as possible over the beam cross-section or over the focus zone in a position-dependent manner. In this case, the focus zones can be arbitrarily close to one another, partly or possibly completely overlap and even form homogeneous focus zones, specifically both transversely, i.e. perpendicularly to the direction of propagation of the partial beams, and longitudinally, i.e. in the direction of propagation of the partial beams.

As an alternative to the use of wholly or partly overlapping partial beams having mutually perpendicular polarization states, it is also possible to use wholly or partly overlapping partial beams which have a time offset having a magnitude such that practically no interference effects occur. This is typically the case if the time offset corresponds at least to the order of magnitude of the pulse duration or the order of magnitude of the coherence length. As a minimum here generally 50% of the respective smaller value of the two values (pulse duration and respectively coherence length) is chosen as time offset.

Even though only one birefringent polarizer element is described in the following description, in principle two or more birefringent polarizer elements can also be provided in the processing optical unit. By way of example, in this case, the laser beam which is generated by a laser source and enters the processing optical unit can be split into two or more partial beams, which each constitute an input laser beam for an associated birefringent polarizer element, or the laser beams of a plurality of laser sources can be used as input laser beams.

For the case where the partial beams have a quasi-nondiffractive beam profile, e.g. a Bessel-like beam profile, these are focused onto a comparatively long focus volume (e.g. of the order of magnitude of millimeters) in comparison with the diameter of the focus zone (e.g. of the order of magnitude of micrometers) during the focusing by means of the focusing optical unit. Nevertheless, even in the context of beam profiles of this type, the present application refers to focusing into a focal plane, for simplification. The focal plane and respectively the planes described further below are predefined by the properties of the respective optical units (independently of the type of beam profile).

In one embodiment, the birefringent polarizer element is configured either for producing a position offset or for producing an angle offset or for producing a combination of an angle offset and a position offset between the two partial beams polarized perpendicularly to one another. With the aid of a birefringent polarizer element, typically in the form of a birefringent crystal, given suitable polarization of the input laser beam, e.g. given an unpolarized input laser beam or given an input laser beam having undefined or circular polarization, the targeted spatial splitting of the input laser beam into its polarization constituents is made possible. Depending on the configuration of the birefringent polarizer element, a well-defined, pure position offset, a well-defined, pure angle offset or a combination of position offset and angle offset can be produced.

In order to produce the position offset (without an angle offset), the birefringent polarizer element can have for example generally planar beam entrance and beam exit surfaces aligned parallel. In this case, the optical axis of the birefringent crystal is typically oriented at an angle with respect to the beam entrance surface. If the input laser beam impinges on the beam entrance surface perpendicularly, a pure position offset is produced at the beam exit surface.

In order to produce the angle offset (without a position offset), the birefringent polarizer element can have a beam exit surface that is inclined at an angle with respect to the beam entrance surface. In this case, the optical axis of the birefringent crystal is typically aligned parallel to the beam entrance surface. In this case, at the beam exit surface, the two partial beams emerge from the birefringent crystal at the same position and with a defined angle offset.

Besides being dependent on the type of laser processing, the arrangement of the birefringent polarizer element in the beam path of the processing optical unit is dependent on whether a pure position offset or a pure angle offset is intended to be produced. The production of a combination of position offset and angle offset is generally rather unfavorable for the present applications, but a combination of position offset and angle offset in the focal plane can be accepted in certain applications. Moreover, such a combination of position offset and angle offset can be expedient in the case of a rotation of the polarizer element (see below).

In order to produce a combination of position offset and angle offset, for example a polarizer element in the form of a conventional prism polarizer can be used, for example a Nicol prism, a Rochon prism, a Glan-Thompson prism or some other type of prism polarizer (cf. e.g. "https://de.wikipedia.org/wiki/Polarisator" or "https://www.b-halle.de/produkte/Polarisatoren.html").

In one development, the birefringent polarizer element is configured for producing an angle offset and is arranged in a plane that is optically conjugate with respect to the focal plane. A plane that is optically conjugate with respect to the focal plane is understood to mean a plane that is correlated with the focal plane by way of a Fourier transformation, i.e. an angle-to-position transformation. If it is assumed that the focusing optical unit has an (effective) image-side focal length $f_2$, the conjugate plane with the polarizer element configured for producing an angle offset is typically arranged at the distance of the object-side focal length $f_1$ of the focusing optical unit. For the special case where $f_1=f_2=f$ holds true, the birefringent polarizer element is arranged at the distance 2 f (or generally 2 f+N×4 f, where N is greater than or equal to 0, and N is an integer) from the focal plane. Hereinafter, for simplification, reference is made to a 2f set-up even if the condition $f_1=f_2=f$ is not met.

In an alternative embodiment, the birefringent polarizer element is configured for producing a position offset and is arranged upstream of a further, preferably collimating optical unit in the beam path, wherein the processing optical unit is configured to image the position offset between the partial beams polarized perpendicularly to one another at the polarizer element into the focal plane. In this case, the birefringent polarizer element can be arranged in a plane corresponding to the focal plane upstream of the further optical unit. Such a plane is correlated with the focal plane by way of two angle-to-position transformations, for example. If it is assumed that the focusing optical unit has an (effective) focal length of f, the plane corresponding to the focal plane with the birefringent polarizer element, in a special case where identical focal lengths are used for the collimation and the focusing, can be arranged at a distance of 4 f (or generally of 4 f+N×4 f, where N is greater than or equal to zero, and N is an integer) from the focal plane. Hereinafter, for simplification, reference is made to a 4f-set-up even if the optical elements used do not necessarily have a uniform focal length f. For the case where the birefringent polarizer element is arranged in the (substantially) collimated beam path, the exact arrangement of polarizer element at a predefined distance from the focal plane is generally not important; all that is essential is an (extensive) position-to-position transformation, i.e. a mapping between the plane with the polarizer element and the focal plane.

However, the birefringent polarizer element should be arranged in the beam path upstream of the further optical unit, which can be configured for example as a collimating optical unit for producing an angle-to-position transformation. Together with the angle-to-position transformation (or equivalently position-to-angle transformation) produced by the focusing optical unit, the position offset of the partial beams that is produced at the polarizer element is converted or mapped into a position offset in the focal plane. The further, e.g. collimating optical unit, jointly with the focusing optical unit, can bring about an imaging of the plane with the birefringent polarizer element onto the focal plane, i.e. onto a plane linked with the focus zone, with a predefined, e.g. reducing, imaging scale.

In a further embodiment, the processing optical unit is configured for producing a plurality of pairs of at least partly overlapping focus zones along a predefined contour, in particular along a preferred direction, in the focal plane, wherein focus zones of in each case two partial beams polarized perpendicularly to one another in directly adjacent pairs at least partly overlap. In this embodiment, at least two pairs of partial beams are produced, the focus zones of which respectively overlap one another, such that along the predefined, not necessarily rectilinear contour a—in the case of a preferred direction linear—beam shape or intensity distribution arises which generally has a continuous transition, i.e. no zeros in the intensity distribution between the partial beams or between the focus zones. Here partial beams polarized perpendicularly to one another in each case in the respective pairs overlap one another, but only to an extent such that these do not overlap the respectively differently polarized partial beam of a respective pair, such that no superimposition of identically polarized partial beams occurs in this case either.

In a further embodiment, the processing optical unit comprises: a preferably diffractive beam splitter optical unit for producing a plurality of pairs of partial beams polarized perpendicularly to one another. The beam splitter optical unit can be configured in the form of a diffractive optical element, for example, but some other type of beam splitter optical unit can also be involved, for example a geometric beam splitter optical unit. The beam splitter optical unit can be arranged upstream of the polarizer element in the beam path of the laser beam entering the processing optical unit and can produce a plurality of input laser beams which are split in each case into a pair of partial beams polarized perpendicularly to one another at the polarizer element. The opposite case is possible, too, i.e. the beam splitter optical unit can be arranged downstream of the birefringent polarizer element in the beam path. In this case, from the pair of partial beams generated by the polarizer element, the beam splitter optical unit produces a plurality of pairs of partial beams, the focus zones of which can partly overlap one another along a preferred direction in particular as described further above.

In a further embodiment, the beam splitter optical unit is arranged in a plane that is optically conjugate with respect to the focal plane. An angle offset between the pairs of partial beams can be produced in the plane that is conjugate with respect to the focal plane, said angle offset being transformed into a position offset in the focal plane by the focusing optical unit. In this case, the beam splitter optical unit can be arranged for example in a plane that is optically conjugate with respect to the focal plane between the further imaging optical unit described above and the focusing optical unit, in order to produce the plurality of pairs of partial beams from a pair of partial beams produced by the polarizer element.

In one development, the beam splitter optical unit is arranged jointly with the birefringent polarizer element in the plane that is optically conjugate with respect to the focal plane. In this case, the polarizer element is generally configured for producing an angle offset. In this case, the polarizer element and the beam splitter optical unit can be configured in the form of plate-shaped optical elements, for example, which are connected to one another or bear against one another at their end sides. Within the meaning of this application, a common arrangement in the plane that is optically conjugate with respect to the focal plane is understood to mean that the optically conjugate plane runs through one of these two optical elements or between the two optical elements. In this case, the polarizer element can be arranged downstream of the beam splitter optical unit in the beam path, but the opposite case is also possible.

In one development of this embodiment, the preferably diffractive beam splitter optical unit is configured as a beam shaping optical unit for converting an entering laser beam having a Gaussian beam profile into an emerging laser beam having a flat-top beam profile. The shaping of a laser beam having a flat-top beam profile, i.e. having a beam profile which has a substantially homogeneous intensity distribution with steeply falling edges, makes it possible to control the intensity distribution on a surface oriented substantially perpendicularly to the propagation direction. The flat-top beam profile can have a round or a rectangular geometry, for example, preferably one side of the rectangle being oriented along the preferred direction produced by the polarization splitting at the polarizer element. If partial beams having such a rectangular flat-top beam profile overlap in the respective edge regions of their focus zones, then a linear beam distribution having an approximately constant intensity can be produced on the workpiece. It goes without saying that instead of having a round or rectangular geometry, the flat-top beam profile can also have a different geometry, for example a geometry in the shape of a rhombus, a circle with circular sectors, etc., in which the partial beams homogeneously supplement one another in the case of juxtaposition along a predefined contour, in particular along a preferred direction.

In one development of this embodiment, the processing optical unit comprises a filter optical unit arranged downstream of the beam splitter optical unit in the beam path. Particularly if the beam splitter optical unit is additionally configured as a beam shaping optical unit for producing a flat-top beam profile, it can be expedient to use a filter optical unit which can be configured e.g. as a phase mask or as a phase filter or in the form of an iris stop or spatial stop, in order to suppress higher orders of diffraction produced during beam shaping.

It goes without saying that the processing optical unit can also comprise a beam shaping optical unit configured for converting an entering laser beam having a Gaussian beam profile into an emerging laser beam having a flat-top beam profile, which beam shaping optical unit is not configured as a beam splitter optical unit. In this case, the processing optical unit can optionally additionally comprise a beam splitter optical unit, but this is not necessarily the case.

In a further embodiment, the processing optical unit comprises: a beam shaping optical unit for converting an entering laser beam having a Gaussian beam profile into an emerging laser beam having a quasi-nondiffractive beam profile, in particular having a Bessel-like beam profile. The use of a quasi-nondiffractive beam profile has proved to be advantageous in particular for glass cutting applications or for selective laser etching since, in the case of such a beam profile, a substantially homogeneous beam profile can be maintained over a comparatively long distance in a longitudinal direction, whereby a modification volume with a preferred direction is produced. In this case, a Bessel beam has proved to be particularly advantageous, but optionally other nondiffractive beam profiles, e.g. an Airy beam profile, a Weber beam profile or a Mathieu beam profile, can also be produced by means of the beam shaping optical unit. The beam shaping optical unit can be configured to produce a quasi-nondiffractive beam profile with a beam cross-section that is rotationally symmetrical with respect to the propagation direction.

In one development, the beam shaping optical unit is configured to produce a quasi-nondiffractive beam profile having a non-rotationally symmetrical beam cross-section, in particular having a preferred direction. It has proved to be expedient if the beam shaping optical unit is configured as a diffractive optical unit in this case. The preferred direction of the nondiffractive beam profile generally corresponds to the (preferred) direction or the plane in which the polarizer element produces the two partial beams. The quasi-nondiffractive beam profile can have a plurality of (secondary) maxima spaced apart from one another along the preferred direction, such that the beam shaping optical unit acts in the manner of a beam splitter optical unit and produces a so-called multi-Bessel beam profile, for example. In this case, the gaps between the maxima of the beam profile are filled by the splitting into the respective two partial beams at the polarizer element. In this way, too, in the focal plane it is possible to produce a plurality of pairs of at least partly overlapping focus zones along a predefined contour, generally along the preferred direction, wherein focus zones of in each case two partial beams polarized perpendicularly to one another in directly adjacent pairs at least partly overlap one another.

In a further embodiment, the beam shaping optical unit comprises an Axicon and/or a diffractive optical element. The production of a (quasi-) nondiffractive beam profile, for example in the form of a Bessel beam, can advantageously be produced by means of an Axicon, which typically comprises at least one substantially conical surface. The Axicon or the conical surface can optionally be modified in order to produce a preferred direction of the beam profile, in order to produce a homogenization of the beam profile, etc. Alternatively or additionally, a diffractive optical element can be used for producing the (quasi-)nondiffractive beam profile. The properties of an Axicon can be simulated by means of such a diffractive optical element. The beam shaping optical unit, optionally alternatively or additionally, can be configured to produce an emerging laser beam having a flat-top beam profile from an entering laser beam having a Gaussian beam profile, etc.

In a further embodiment, the processing optical unit comprises a rotary drive for rotating the birefringent polarizer element and preferably the beam splitter optical unit and/or the beam shaping optical unit about a (common) rotation axis The rotation is expedient in particular if the intention is to produce partly overlapping focus zones along a predefined contour, in particular along a preferred direction. During rotation, what has an expedient effect is the fact that the birefringent polarizer element constitutes an alignment-noncritical component, which fosters use in adaptive optics, in particular. However, the position offset or the angle offset produced by the polarizer element is generally not symmetrical with respect to the direction of propagation of the input beam or with respect to the rotation axis. During the rotation of the polarizer element about a rotation axis, which generally runs in a longitudinal direction, i.e. along the direction of propagation of the input beam, which enables a tracking or rotation of the preferred direction—described further above—of the focus zones depending on the respective application or on the relative movement between the processing optical unit and the workpiece, possibly an undesired, rotation-angle-dependent angle offset and/or position offset of the partial beams therefore occurs. In order to compensate for said offset, it is possible to use a suitably configured polarizer element, for example a Rochon prism, through which the partial beam in the form of the ordinary ray passes without deflection, while the partial beam in the form of the extraordinary ray experiences both an angle offset and a position offset compensating for the offset during the rotation of Rochon prism.

During workpiece processing in the form of a laser cutting process for cutting glass along a processing path, it may be necessary or expedient to vary the preferred direction of the focus zones depending on a position-dependently variable advance direction during the movement relative to the workpiece, in order to promote crack propagation in the glass along the advance direction. The targeted orientation of cracks during glass separation makes it possible to work in a process regime that enables significantly simplified separation of the glass. In such a glass cutting application, generally the focus zones of two or more Bessel (Gaussian) beams are at least partly superimposed spatially, as has been described in greater detail further above. For varying the preferred direction, in this case it is not necessary for alignment-critical optical elements such as e.g. lenses likewise to be rotated, even if such a rotation is likewise possible in principle.

In a further embodiment, the processing optical unit comprises a polarization-influencing device for producing a circularly polarized input laser beam. The laser source generally generates a linearly polarized input laser beam that can be converted into a circularly polarized input laser beam at the polarization-influencing device, for example in the form of a suitably oriented λ/4 plate. This is expedient in particular if, as described further above, the polarizer element is rotated by means of the rotary drive. During the rotation of the polarizer element (without rotation of the λ/4 plate), in the case of a circularly polarized input laser beam, in contrast to a linearly polarized input beam, the splitting ratio of the intensities of the two partial beams polarized perpendicularly to one another does not vary during the rotation, i.e. that is not dependent on the rotation angle.

For the case where the splitting ratio of the intensity or the power of the two partial beams produced at the polarizer element is intended to be influenced in a targeted manner the polarization direction or the polarization plane of the input beam (which in this case impinges on the polarizer element in linearly polarized fashion) can be rotated in a targeted manner. A retardation device, for example a λ/2 plate, or a λ/4 plate, can be used for this purpose. With the use of a λ/2 plate, the input beam that impinges thereon is typically linearly polarized. In this case, a rotation of the λ/2 plate enables the polarization direction of the linearly polarized input laser beam to be rotated, whereby it is possible to set the splitting ratio of the power of the input laser beam to the two partial beams polarized perpendicularly to one another.

With the use of a λ/4 plate, the input laser beam that impinges thereon is generally circularly polarized and is converted into a linearly polarized input laser beam by the λ/4 plate. In this case, too, a rotation of the λ/4 plate enables the polarization direction of the input laser beam to be rotated and the splitting ratio thus to be set.

The disclosure also relates to a laser processing apparatus comprising: a processing optical unit as described further above and a laser source, in particular an ultrashort pulse laser source, for generating a laser beam, in particular a laser beam having a Gaussian beam profile. The laser source is preferably configured for generating a single-mode laser beam having a Gaussian beam profile, but this is not absolutely necessary. The processing optical unit can be accommodated in a laser processing head or in a housing of a laser processing head, for example, which is movable relative to the workpiece. Alternatively or additionally, the laser processing apparatus can comprise a scanner device in order to align the partial beams with the workpiece or with different positions on the workpiece. Besides the optical units described further above, the processing optical unit can also comprise further optical units enabling, for example, spatial filtering or spatial rearrangement of the input laser beam in order to foster the beam shaping, e.g. the homogenization of a Bessel-like beam profile, mask imaging, etc.

The disclosure also relates to a method of the type mentioned in the introduction in which the partial beams polarized perpendicularly to one another are focused onto at least partly overlapping focus zones in the focal plane. The method affords the advantages described further above in association with the processing optical unit. The laser processing or the workpiece processing can be laser erosion, laser cutting, surface structuring, laser welding, laser drilling, . . . . Depending on the respective processing application, it may be expedient to use either a birefringent beam splitter element which produces an angle offset but only an insignificant position offset (2 f set-up, e.g. in the case of beam splitter applications or laser erosion), or a birefringent beam splitter element which produces a position offset but only an insignificant angle offset (4 f set-up, for example in the case of the use of Bessel-like beam profiles during glass separation or glass cutting).

Further advantages are evident from the description and the drawing. Likewise, the features mentioned above and those that will also be presented further can be used in each case by themselves or as a plurality in any desired combinations. The embodiments shown and described should not be understood as an exhaustive enumeration, but rather are of exemplary character.

In the following description of the drawings, identical reference signs are used for identical or functionally identical components.

FIGS. 1a, 1b each show schematically a birefringent polarizer element 1a, 1b in the form of a birefringent crystal. Various birefringent materials can be used as crystal material for the polarizer element 1a, 1b, e.g. angle offset-BBO (alpha-barium borate), YVO4 (yttrium vanadate), crystalline quartz, etc. The birefringent polarizer element 1a from FIG. 1a is configured in wedge-shaped fashion, i.e. a planar beam entrance surface 2a for the entrance of an input laser beam 3 and a planar beam exit surface 2b of the polarizer element 1a are oriented at a (wedge) angle with respect to one another. The or an optical axis 4 of the crystal material is oriented parallel to the beam entrance surface 2a.

The unpolarized or circularly polarized input laser beam 3 entering the birefringent polarizer element 1a perpendicularly to the beam entrance surface 2a is split into two partial beams 5a, 5b, which are perpendicular to one another (s- and p-polarized, respectively), at the beam exit surface 2b, which is inclined at an angle with respect to the beam entrance surface 2a. In FIG. 1a, as generally customary, the s-polarized partial beam 5a is identified by a dot, while the second, p-polarized partial beam 5b is identified by a double-headed arrow. The first, p-polarized partial beam 5a is refracted to a lesser extent than the second, s-polarized partial beam 5b upon emergence from the birefringent polarizer element 1a, with the result that an angle offset $\Delta\alpha$ occurs between the first and second partial beams 5a, 5b. In this case, the first and second partial beams 5a, 5b emerge from the birefringent polarizer element 1a at the same location at the beam exit surface 2b, that is to say that the angle offset $\Delta\alpha$, but no position offset, is produced between the two partial beams 5a, 5b.

In the case of the polarizer element 1b shown in FIG. 1b, the beam entrance surface 2a and the beam exit surface 2b are aligned parallel to one another and the optical axis 4 of the crystal material is oriented at an angle of 45° with respect to the beam entrance surface 2a. In this case, the input beam 3 impinging perpendicularly to the beam entrance surface 2a is split into a first partial beam 5a in the form of an ordinary ray and a second partial beam 5b in the form of an extraordinary ray at the beam entrance surface 2a. The two partial beams 5a, 5b emerge parallel, i.e. without an angle offset, but with a position offset $\Delta x$ at the beam exit surface 2b.

The two birefringent polarizer elements 1a, 1b illustrated in FIGS. 1a and 1n FIG. 1b thus differ fundamentally in that the polarizer element 1a shown in FIG. 1a produces an angle offset $\Delta\alpha$ (without a position offset) and the polarizer element 1b shown in FIG. 1b produces a position offset $\Delta x$ (without an angle offset). Both polarizer elements 1a, 1b can form a component of a processing optical unit 6, which can be configured for example as illustrated in FIGS. 2a,b. It goes without saying that the processing optical unit 6 can also comprise polarizer elements which produce both a position offset $\Delta x$ and an angle offset $\Delta\alpha$, as is the case in conventional prism polarizers, which generally comprise two birefringent optical elements. In particular, the processing optical unit 6 can comprise a polarizer element that compensates for an angle offset and/or a position offset occurring during the rotation of the polarizer element (see below). By way of example, a Rochon prism can be used as polarizer element in this case.

The processing optical unit 6 illustrated in FIGS. 2a,b comprises a focusing optical unit 7, which serves for focusing the two partial beams 5a, 5b onto a focal plane 8, which lies at the top side of a workpiece 9 to be processed in FIGS. 2a,b. In contrast to the illustration in FIGS. 2a,b, the focal plane 8 can also lie in the beam path 10 of the processing optical unit 6 just upstream of the workpiece 9, in a plane within the workpiece 9 or just downstream of the workpiece 9. The input laser beam 3 that impinges on the birefringent polarizer element 1a, 1b corresponds to a laser beam 12 which is generated by a laser source 11 and enters the processing optical unit 6. The processing optical unit 6 shown in FIGS. 2a,b is configured to focus the two partial beams 5a, 5b onto two focus zones 13a, 13b in the focal plane 8, which partly overlap one another and which are represented by a black circle and a white circle in FIGS. 2a,b. The processing optical unit 6 illustrated in FIG. 2a, together with the laser source 11, forms a laser processing apparatus 14 for processing the workpiece 9, for example in the form of erosion laser processing. For this purpose, the processing optical unit 6 can be moved relative to the workpiece 9 and/or comprise a scanner device for aligning the partial beams 5a, 5b with different positions in the focal plane 8.

In the case of the processing optical unit 6 illustrated in FIG. 2a, the birefringent polarizer element 1a is arranged in a plane 15 that is optically conjugate with respect to the focal plane 8. The optically conjugate plane 15 is linked with the focal plane 8 by an angle-to-position transformation (Fourier transformation) produced by the focusing optical unit 7. Angles in the optically conjugate plane 15 correspond to positions in the focal plane 8, and vice versa. The two partial beams 5a, 5b emerging from the polarizer element 1a with the angle offset $\Delta\alpha$ are therefore focused with a position offset $\Delta X'$ of the two centers of the focus zones 13a,b in the focal plane 8 which is smaller than the diameter of the focus zones 13a,b, such that the two focus zones 13a,b overlap one another. Owing to the absence of the position offset of the two partial beams 5a, 5b emerging from the polarizer element 1a, the two partial beams 5a, 5b, after passing through the focusing optical unit 7, are oriented parallel and perpendicularly to the focal plane 8. In the example shown in FIG. 2a, the distance between the focal plane 8 and the optically conjugate plane 15 is 2 f, wherein f denotes the focal length of the focusing optical unit 7.

The processing optical unit 6 illustrated in FIG. 2b comprises a further imaging optical unit 16, which is arranged upstream of the focusing optical unit 7 in the beam path 10. The imaging optical unit 16, jointly with the focusing optical unit 7, images the two partial beams 5a, 5b into the focal plane 8, said partial beams having been produced with a position offset $\Delta x$ at the polarizer element 1b arranged upstream of the further imaging or collimating optical unit 16 in the beam path 10. The imaging scale during the imaging into the focal plane 8 is chosen here in such a way that the diameter of the partial beams 5a,b and the distance $\Delta x'$ between the two partial beams 5a,b in the focal plane 8 are reduced. In the example illustrated in FIG. 2b, for simplification, the polarizer element 1b is arranged at a distance of 4 f from the focal plane 8 in a further plane 17, corresponding to the focal plane 8. In general, the further optical unit 16 and the focusing optical unit 7 have different focal lengths $f_1$, $f_2$, i.e. the further plane 17 is arranged at the distance 2 $(f_1+f_2)$. Through the choice of suitable different focal lengths $f_1$, $f_2$, it is possible to set the imaging scale, for example in order to bring about the reduction described further above.

The spatial distribution in the further plane 17 corresponds to the spatial distribution in the focal plane 8 (with an adaptation of the scale). Since the polarizer element 1b is arranged in the collimated beam path 10 of the laser beam 12 that enters the processing optical unit 6, it is not absolutely necessary for said polarizer element to be positioned in the further plane 17; rather, said polarizer element can also be arranged upstream or downstream of the further plane 17 in the beam path 10.

FIGS. 3a,3b respectively show the processing optical unit 6 from FIGS. 2a,b with an additional diffractive beam splitter optical unit 18 configured for producing a plurality of pairs 19 of focus zones 13a, 13b running along a preferred direction X in the focal plane 8, as illustrated in FIGS. 3a,b. The focus zones 13a,b of a pair 19 are formed by partial beams 5a, 5b polarized perpendicularly to one another in each case and partly overlapping one another, as is also illustrated in FIGS. 2a,b. In addition, the focus zones 13a, 13b of respectively two partial beams 5a, 5b polarized perpendicularly to one another in respectively two directly adjacent pairs 19 also overlap one another. In all the focus zones 13a, 13b illustrated in FIGS. 3a,b, only partial beams 5a, 5b polarized perpendicularly to one another overlap one another, and so no interference effects occur between the partial beams 5a, 5b. The substantially linear intensity distribution which is produced in this way in the focal plane 8 and extends along the preferred direction X increases the efficiency during laser erosion of the surface of an e.g. metallic workpiece 9.

In the case of the processing optical unit 6 shown in FIG. 3a, the beam splitter optical unit 18 is arranged downstream of the polarizer element 1a in the beam path 10. The diffractive beam splitter optical unit 18 is illustrated downstream of the polarizer element 1a in the beam path 10 merely by way of example in FIG. 3a and can alternatively also be arranged upstream of the polarizer element 1a. In the case of the processing optical unit 6 shown in FIG. 3b, the beam splitter optical unit 18 is arranged between the further imaging optical unit 16 and the focusing optical unit 7 in the beam path 10, specifically in a plane 15 that is optically conjugate with respect to the focal plane 8. In particular, both optical elements 1a, 18 can also be arranged in a common plane, as will be described in greater detail further below.

In the case of the processing optical unit 6 shown in FIGS. 4a,b, as in FIGS. 2a,b, the input laser beam 3 is split into two partial beams 5a,b, the focus zones 13a,b of which overlap one another in the focal plane 8. The processing optical unit 6 in FIGS. 4a,b comprises a beam shaping optical unit 20 for converting a laser beam entering the processing optical unit 6, which laser beam, in the example shown, corresponds to the laser beam 12 having a Gaussian beam profile that is generated by the laser source 11, into an input laser beam 3 having a quasi-nondiffractive beam profile, to put it more precisely having a Bessel-like beam profile.

The Bessel-like beam profile can be rotationally symmetrical with respect to the direction of propagation, but it is also possible for the beam shaping optical unit 20 to produce a non-rotationally symmetrical beam profile having a preferred direction, i.e. the beam shaping optical unit 20 acts in the manner of a beam splitter optical unit. Other or more complex beam profiles, e.g. nondiffractive beam profiles such as Airy beam profiles, Mathieu beam profiles, a beam homogenization, the production of a vortex, of a bottle, . . . , can also be produced with the aid of the beam shaping optical unit 20. The beam shaping optical unit 20 can be configured as a diffractive optical element, as an Axicon, . . . or a combination of these elements. The beam shaping optical unit 20 can also be configured as a diffractive optical element having the function of an Axicon.

Downstream of the beam shaping optical unit 20 in the present example a beam profile is present which corresponds to a substantially rotationally symmetrical Bessel beam, i.e. to a radial intensity profile in the transverse direction in the form of a Bessel function. The processing optical unit 6 shown in FIG. 4a additionally comprises an imaging or collimating optical unit 16, which is arranged between the beam shaping optical unit 20 and the polarizer element 1a in the beam path 10 and which serves for reduced imaging. In FIG. 4a, the far field of the Bessel-like beam profile is present at the position of the polarizer element 1a. The production of a beam profile in the form of a Bessel-like beam has proved to be advantageous for the separation of a workpiece 9 which is produced from a transparent material, for example from glass, and for which separation and, if appropriate, crack guidance along a predefined direction are expedient, which can correspond to the preferred direction X shown in FIGS. 4a,b, but which can also be oriented at a predefined angle with respect to the preferred direction X or, if appropriate, forms a predefined contour deviating from a line. The fact that the longitudinal beam profile of the partial beams 5a, 5b that penetrate into the workpiece 9 proceeds virtually homogeneously over a comparatively long length also facilitates the separation, if appropriate with crack formation, and thus the separating processing of the glass material.

The processing optical unit 6 illustrated in FIGS. 5a,b corresponds to the processing optical unit 6 illustrated in FIGS. 4a,b, but additionally comprises a beam splitter optical unit 18, which, as described in association with FIGS. 3a,b, is configured for producing a plurality of pairs 19 of focus zones 13a, 13b in the focal plane 8 which are arranged next to one another along the preferred direction X.

The transverse beam profile produced by the processing optical unit 6 illustrated in FIGS. 4a,b in the focal plane 8 (in the X-direction) for one polarization direction, e.g. for s-polarized partial beams 5a, is illustrated in FIG. 7a. In the example shown, the beam shaping optical unit 20 produces a non-rotationally symmetrical beam profile illustrated in FIG. 7a, said beam profile having a plurality of maxima (multi-Bessel) along a preferred direction (X-direction), i.e. the beam shaping optical unit 20 acts virtually in the manner of a beam splitter optical unit. FIG. 7b shows the transverse beam profile in the focal plane 8 upon the partial superimposition of the focus zones 13a, 13b of partial beams 5a, 5b polarized perpendicularly to one another, as is produced with the aid of the polarizer element 1b from FIG. 4b. FIG. 8 analogously shows the longitudinal beam profile produced by the processing optical unit 6 shown in FIG. 5b, without (at the top in FIG. 8) and with (at the bottom in FIG. 8) superimposition of the partial beams 5a, 5b polarized perpendicularly to one another by means of the polarizer element 1b.

Figure 6:
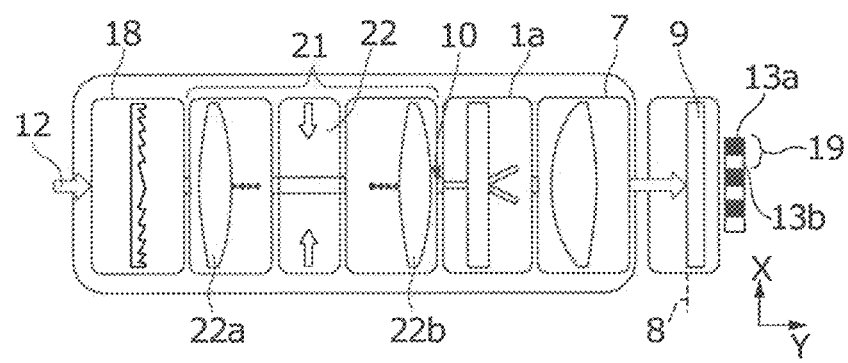
FIG. 6 shows a schematic illustration of a processing optical unit analogous to FIG. 3a with a flat-top beam profile-shaping optical unit for producing partly overlapping focus zones that form a substantially homogeneous beam profile.

FIG. 6 shows a processing optical unit 6 which corresponds to the processing optical unit 6 shown in FIG. 3a and in which the beam splitter optical unit 18 is additionally configured as a beam shaping optical unit for converting an entering laser beam 12 into an emerging laser beam having a flat-top beam profile. Unlike in FIG. 3a, the beam splitter optical unit 18 is arranged upstream of the polarizer element 1a in the beam path 10. A filter optical unit 21 is arranged between the beam splitter optical unit 18 and the polarizer element 1a, and comprises an optical filter element 22 that separates parasitic radiation portions from the useful radiation. The filter element 22 can be configured for example in the form of a stop or in the form of a phase mask 22. The filter element 22 is arranged between two further imaging (collimating or focusing) optical units 22a, 22b. The filter optical unit 21 serves for filtering undesired diffraction portions produced during the beam shaping by means of the beam splitter optical unit 18 and prevents these parasitic radiation portions from reaching the workpiece 9 or other locations at which they have a disturbing effect. In the example shown in FIG. 6, instead of the polarizer element 1a configured for producing an angle offset $\Delta\alpha$ (without a position offset), a polarizer element 1b configured for producing a position offset $\Delta x$ (without an angle offset) could be arranged in a manner adjoining the filter element 22.

The intensity profile produced in the focal plane 8 is illustrated for the focus zones 13a assigned to the first partial beams 5a in FIG. 9a. As can be discerned in FIG. 9a, in each case rectangular focus zones 13a having a substantially constant radiation intensity are produced in the focal plane 8. FIG. 9b shows the intensity profile in the focal plane 8 for the overlapping focus zones 13a,b—illustrated in FIG.

6—of the two partial beams 5a, 5b polarized perpendicularly to one another. As can be discerned in FIG. 9b, with the aid of the polarizer element 1a a substantially homogeneous linear intensity or beam profile is produced in the focal plane 8 along the preferred direction X. The intensity profile shown in FIGS. 9a,b can in principle also be produced (more compactly) by means of the processing optical unit 6 shown in FIGS. 3a,b. In the case, too, of the processing optical unit 6 shown in FIGS. 3a,b, it is possible to use a filter optical unit 21 or a filter element 22 arranged downstream of the beam splitter optical unit 18 in the beam path 10.

Figure 10A:
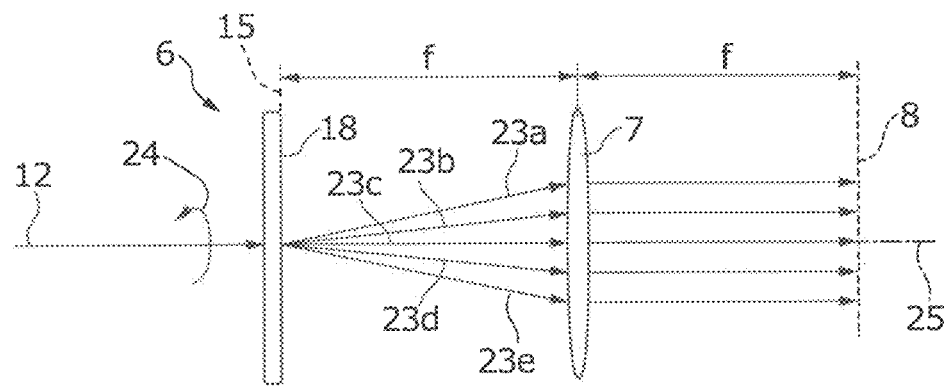
FIGS. 10a,10b show schematic illustrations of a configuration of the processing optical unit from FIG. 3b, and FIGS. 11a-11c show schematic illustrations of the processing optical unit from FIG. 4b with a beam shaping optical unit in the form of an Axicon.
Figure 10B:
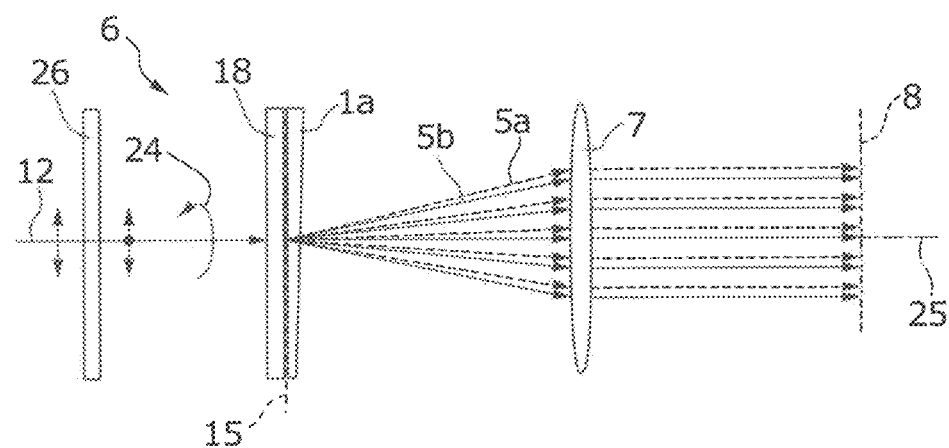

The beam path 10 of the processing optical unit 6 illustrated schematically in FIG. 3a is illustrated in a more realistic way in FIGS. 10a,b. In this case, FIG. 10a shows the beam path 10 without the polarizer element 1a, i.e. only the diffractive, plate-shaped beam splitter optical unit 18, which produces, from the laser beam 12 entering the processing optical unit 6, a plurality of for example five emerging laser beams 23a-e, which are focused onto the focal plane 8 by means of the focusing optical unit 17. FIG. 10b shows the processing optical unit 6 from FIG. 10a, additionally comprising the polarizer element 1a, which is arranged downstream of the diffractive optical element 18 in the beam path 10 and which splits each of the emerging laser beams 23a-e into two partial beams 5a, 5b polarized perpendicularly to one another. The focusing optical unit 7 in the form of a focusing lens aligns the partial beams 5a, 5b parallel to one another, such that the latter impinge on the focal plane 8 perpendicularly. The focus zones 13a, 13b—not illustrated pictorially—of the respective mutually perpendicular partial beams 5a, 5b overlap one another in this case. As can likewise be discerned in FIGS. 10a,b, the processing optical unit 6 comprises a rotary drive 24, indicated by an arrow, in order to rotate the plate-shaped diffractive optical element 18 jointly with the polarizer element 1a secured thereto about a rotation axis 25 running centrally and parallel to the direction of propagation of the input beam 12. The rotation makes it possible to rotate the orientation of the partial beams 5a, 5b in the focal plane 8 or the preferred direction X.

In order to avoid an undesired offset of the partial beams 23a-e in the focal plane 8, said offset being dependent on the rotation angle about the rotation axis 25, the processing optical unit 6 illustrated in FIG. 10b comprises a polarization-influencing device in the form of a λ/4 plate 26. The λ/4 plate 26 is oriented suitably in order to convert the linear polarization of the input laser beam 12 into a circular polarization. On account of the circular polarization of the input laser beam 12, besides the undesired offset it is also possible to avoid a—generally undesired—variation of the splitting of the power of the input laser beam 12 between the two partial beams 5a,b polarized perpendicularly to one another, said variation being dependent on the rotation angle about the rotation axis 25.

Figure 11A:
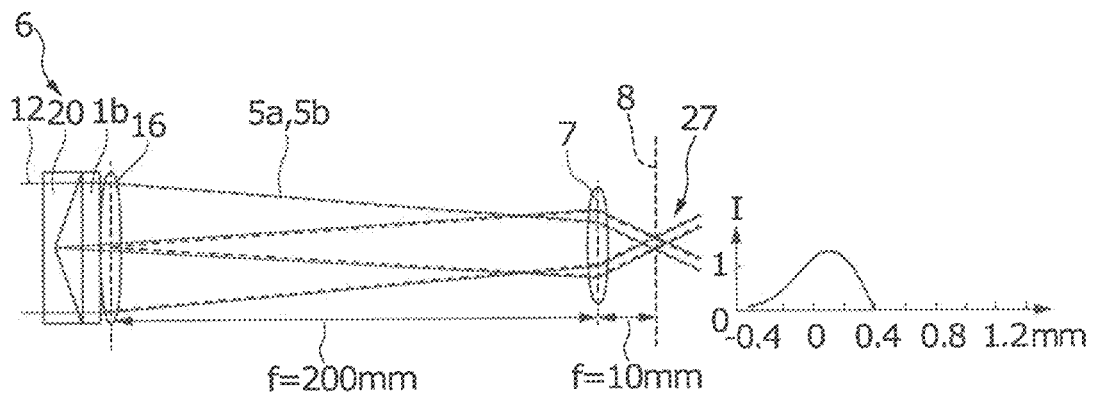
Figure 11B:
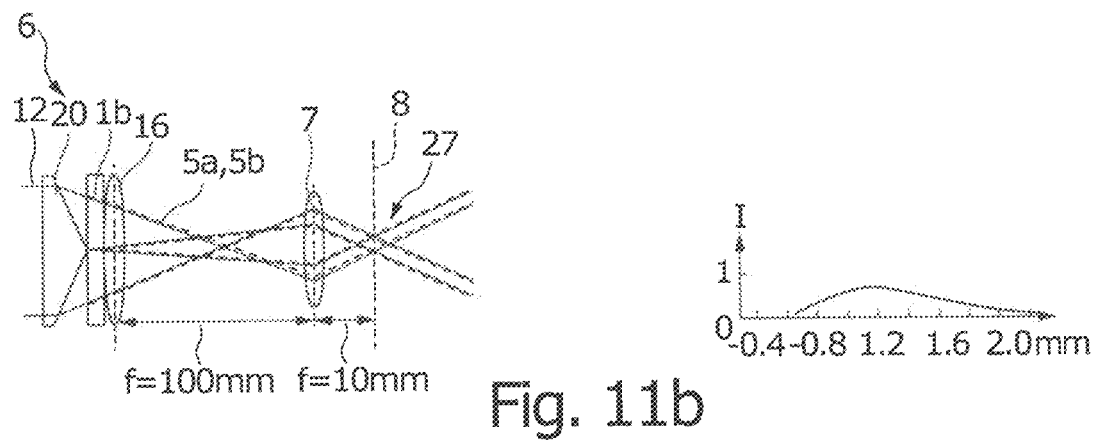
Figure 11C:
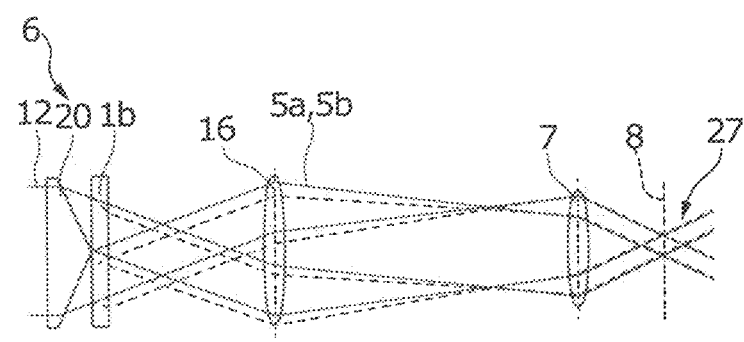

FIGS. 11a-c each show a processing optical unit 6 corresponding to the processing optical unit 6 illustrated in FIG. 4b. The processing optical unit 6 comprises a refractive optical element in the form of an Axicon 20 in order to produce a Bessel-like beam profile from the input beam 12 having the Gaussian beam profile. Instead of the Axicon 20, a diffractive optical element can also be used as beam shaping optical unit. Particularly with the use of a diffractive optical element, it is also possible to produce a Bessel-like beam profile with a preferred direction (X-direction) (cf. FIG. 7a), i.e. the beam shaping optical unit 20 acts in the manner of a beam splitter optical unit. The downstream polarizer element 1b in the beam path splits the input beam 12 between the two partial beams 5a, 5b polarized perpendicularly to one another, which are focused onto the focal plane 8 by the imaging optical unit 16 (with focal length f=200 mm in FIG. 11a or respectively with focal length f=100 mm in FIG. 11b) and the focusing optical unit 7 (with focal length f=10 mm). A focus profile 27 that is comparatively elongated in the longitudinal direction thus arises in the focal plane 8, the intensity distribution of said focus profile being illustrated in each case on the right-hand side in FIGS. 11a,b.

The processing optical unit 6 illustrated in FIG. 11a differs from the processing optical units 6 illustrated in FIGS. 11b,c in that the Axicon 20 shown in FIG. 11a is an inverse Axicon, in which the conical surface is concavely curved, while the Axicon 20 shown in FIGS. 11b,c is a conventional Axicon 20, in which the conical surface is convexly curved. It goes without saying that the Axicon 20 shown in FIGS. 11b,c can also be replaced by a suitably configured diffractive optical element or can optionally be combined therewith. The processing optical unit 6 illustrated in FIG. 11c differs from the processing optical unit 6 illustrated in FIG. 11b in that the further imaging optical unit 16 is arranged in a manner spaced apart from the polarizer element 1b. A glass cutting application can be carried out particularly advantageously with the processing optical unit 6 illustrated in FIGS. 11a-c. Depending on the application, it may be expedient to produce left and respectively right circularly polarized partial beams 5a, 5b instead of linearly polarized partial beams 5a, 5b in the focal plane 8. For this purpose, a retardation element, e.g. in the form of a λ/4 plate, can be arranged at a suitable location downstream of the polarizer element 1a, 1b in the beam path 10.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A processing optical unit for workpiece processing, comprising:
a beam shaping optical unit configured to convert at least one input laser beam with a Gaussian beam profile into an emerging laser beam with a quasi-nondiffractive beam profile,
a birefringent polarizer positioned downstream from the beam shaping optical unit in a beam path and configured to split the emerging laser beam into a pair of partial beams polarized perpendicularly to one another, and
a focusing optical unit arranged downstream of the birefringent polarizer in the beam path and configured to focus the pair of partial beams onto focus zones in a focal plane,
wherein the focus zones of the pair of partial beams at least partly overlap with each other.

2. The processing optical unit as claimed in claim 1, wherein the birefringent polarizer element is configured to produce a position offset, an angle offset, or a combination of the position offset and the angle offset between the pair of partial beams.

3. The processing optical unit as claimed in claim 2, wherein the birefringent polarizer element is configured to produce the angle offset and is arranged in a plane that is optically conjugate with respect to the focal plane.

4. The processing optical unit as claimed in claim 2, wherein the birefringent polarizer element is configured to produce the position offset and is arranged upstream of a further optical unit in the beam path, wherein the processing optical unit is configured to image the position offset between the pair of partial beams into the focal plane.

5. The processing optical unit as claimed in claim 1, wherein the processing optical unit is configured for producing a plurality of pairs of at least partly overlapping focus zones along a predefined contour in the focal plane, wherein focus zones of in each case two partial beams polarized perpendicularly to one another in directly adjacent pairs at least partly overlap.

6. The processing optical unit as claimed in claim 5, further comprising a diffractive beam splitter optical unit configured to produce the plurality of pairs of partial beams polarized perpendicularly to one another.

7. The processing optical unit as claimed in claim 6, wherein the diffractive beam splitter optical unit is arranged in a plane that is optically conjugate with respect to the focal plane.

8. The processing optical unit as claimed in claim 7, wherein the diffractive beam splitter optical unit is arranged jointly with the birefringent polarizer element in the plane that is optically conjugate with respect to the focal plane.

9. The processing optical unit as claimed in claim 6, further comprising a filter optical unit disposed downstream of the diffractive beam splitter optical unit.

10. The processing optical unit as claimed in claim 1, wherein the beam shaping optical unit is configured to produce a non-rotationally symmetrical quasi-nondiffractive beam profile.

11. The processing optical unit as claimed in claim 1, wherein the beam shaping optical unit is configured as an Axicon or as a diffractive optical element.

12. The processing optical unit as claimed in claim 1, further comprising a rotary drive configured to rotate the birefringent polarizer element about a rotation axis.

13. The processing optical unit as claimed in claim 1, further comprising a polarization-influencing device configured to produce a circularly polarized input laser beam.

14. A laser processing apparatus, comprising:
the processing optical unit as claimed in claim 1, and
a laser source configured to generate the input laser beam.

15. The laser processing apparatus as claimed in claim 14, wherein the laser source is an ultrashort pulse laser source.

16. A method for the laser processing of a workpiece via a processing optical unit, the method comprising:
providing at least one input laser beam having a Gaussian beam profile,
performing beam shaping of the at least one input laser beam via a beam shaping optical unit of the processing optical unit to convert the at least one input laser beam into an emerging laser beam with a quasi-nondiffractive beam profile,
splitting the emerging laser beam into a pair of partial beams polarized perpendicularly to one another at a birefringent polarizer element of the processing optical unit, and
focusing the partial beams onto focus zones in a focal plane in a region of the workpiece via a focusing optical unit of the processing optical unit,
wherein the focus zones at least partly overlap with each other.

* * * * *